(12) United States Patent
Kita et al.

(10) Patent No.: US 11,880,116 B2
(45) Date of Patent: Jan. 23, 2024

(54) OPTICAL DIGITAL/ANALOG CONVERTER

(71) Applicant: Nippon Telegraph and Telephone Corporation, Tokyo (JP)

(72) Inventors: Shota Kita, Tokyo (JP); Akihiko Shinya, Tokyo (JP); Masaya Notomi, Tokyo (JP); Kengo Nozaki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 481 days.

(21) Appl. No.: 17/266,943

(22) PCT Filed: Jun. 21, 2019

(86) PCT No.: PCT/JP2019/024735
§ 371 (c)(1),
(2) Date: Feb. 8, 2021

(87) PCT Pub. No.: WO2020/039727
PCT Pub. Date: Feb. 27, 2020

(65) Prior Publication Data
US 2021/0278746 A1   Sep. 9, 2021

(30) Foreign Application Priority Data

Aug. 22, 2018  (JP) ................................ 2018-155199

(51) Int. Cl.
*G02F 7/00* (2006.01)
*G02B 6/12* (2006.01)
(Continued)

(52) U.S. Cl.
CPC ................. *G02F 7/00* (2013.01); *G02B 6/12* (2013.01); *G02B 6/125* (2013.01); *G02F 3/00* (2013.01)

(58) Field of Classification Search
CPC .... G02F 7/00; G02F 3/00; G02B 6/12; G02B 6/125
(Continued)

(56) References Cited

U.S. PATENT DOCUMENTS

| 5,039,988 A | 8/1991 | Hong |
| 5,351,317 A | 9/1994 | Weber |

(Continued)

FOREIGN PATENT DOCUMENTS

JP   H06160654 A   6/1994

OTHER PUBLICATIONS

L. Zhang, et al., "Demonstration of a 3-bit optical digital-to-analog converter based on silicon microring resonatorss," vol. 39, Sep. 30, 2014, 5 pages.

(Continued)

*Primary Examiner* — Khai M Nguyen
(74) *Attorney, Agent, or Firm* — Slater Matsil, LLP

(57) ABSTRACT

An optical DAC includes a 1:N splitter that splits a single light beam into N light beams corresponding to bits of an N-bit electrical digital signal (where N is an integer of 2 or more) and makes the N light beams different in optical intensities such that (N−1) light beams corresponding to bits except a least significant bit of the N-bit electrical digital signal each have an optical intensity which is four times as large as an optical intensity of a light beam corresponding to a next less significant bit, an optical intensity modulator that individually intensity-modulates the N light beams, an N:1 combiner that combines the N output light beams intensity-modulated by the optical intensity modulator and outputs the combined light, and a phase shifter that is adjustable such that the light beams that are combined by the N:1 combiner are made in phase.

18 Claims, 4 Drawing Sheets

(51) Int. Cl.
*G02F 3/00* (2006.01)
*G02B 6/125* (2006.01)

(58) Field of Classification Search
USPC .................................................. 341/137, 144
See application file for complete search history.

(56) References Cited

U.S. PATENT DOCUMENTS

| | | | | |
|---|---|---|---|---|
| 5,822,108 A | * | 10/1998 | Davidson | G02F 7/00 359/276 |
| 7,403,711 B2 | * | 7/2008 | Chen | H04B 10/66 341/137 |
| 2007/0159369 A1 | | 7/2007 | Currie et al. | |

OTHER PUBLICATIONS

S. Kita, et al., "Proposal for a photonic D/A converter whose lossdecreases against the scale," The 79 Fall Academic Lecture Series of the Japan Society of Applied Physics, Sep. 5, 2018, 3 pages.

* cited by examiner

OPTICAL DIGITAL/ANALOG CONVERTER

This patent application is a national phase filing under section 371 of PCT/JP2019/024735, filed Jun. 21, 2019, which claims the priority of Japanese patent application 2018-155199, filed Aug. 22, 2018, each of which is incorporated herein by reference in its entirety.

TECHNICAL FIELD

The present invention relates to an optical digital-to-analog converter (DAC) using an optical circuit.

BACKGROUND

Various types of digital-to-analog converters (DACs) using electric circuits have already been proposed, which differ in performance such as sampling rate, resolution, power consumption, or size. That is, currently, DACs of different schemes are used selectively depending on their applications. For example, in the case of current commercial products, a sampling rate of about 1 GS/s is regarded as a high speed and a resolution of 16 bits or more is regarded as a high resolution. It is conceivable that higher speed, higher resolution, lower power consumption, and more compact DACs will further be required due to future developments in communication, video technology, or the like. It is also expected that latency (delay) required for high-resolution DACs will become a bottleneck in the future.

An optical DAC using an optical circuit has been proposed as a DAC that can meet the above requirements (see Non Patent Literature 1).

However, the optical DAC of the related art has problems that it operates partly through an electric circuit, thereby limiting the speed, and that it requires a great number of elements and a great circuit size.

CITATION LIST

Non Patent Literature

Non Patent Literature 1: L. Yang et al., "Demonstration of a 3-bit optical digital-to-analog converter based on silicon microring resonators," OPTICS LETTERS, Vol. 39, No. 19, pp. 5736-5739, 2014.

SUMMARY

Technical Problem

The present invention has been made to solve the above problems and it is an object of embodiments of the present invention to provide an optical DAC that can be implemented at high speed and high density.

Means for Solving the Problem

An optical digital-to-analog converter of embodiments of the present invention includes a first splitter configured to split a single light beam into N light beams corresponding to bits of an N-bit electrical digital signal (where N is an integer of 2 or more) and make the N light beams different in optical intensities such that (N−1) light beams corresponding to bits except a least significant bit of the N-bit electrical digital signal each have an optical intensity which is a predetermined multiple of an optical intensity of a light beam corresponding to a next less significant bit, an optical intensity modulator configured to individually intensity-modulate the N light beams which are made different in optical intensities by the first splitter according to corresponding bits of the N-bit electrical digital signal, and a combiner configured to combine the N output light beams intensity-modulated by the optical intensity modulator and output the combined light beam.

In an exemplary configuration of the optical digital-to-analog converter of embodiments of the present invention, the first splitter is configured to make the N light beams different in optical intensities such that the (N−1) light beams corresponding to the bits except the least significant bit of the N-bit electrical digital signal each have an optical intensity which is four times as large as an optical intensity of a light beam corresponding to a next less significant bit.

In an exemplary configuration of the optical digital-to-analog converter of embodiments of the present invention, the first splitter includes (N−1) Y-splitting optical waveguides having a splitting ratio of 1:3, the Y-splitting optical waveguides are cascade-connected such that each Y-splitting optical waveguide except a most upstream Y-splitting optical waveguide receives, as an input, a light beam that is output from an optical output port with a lower output intensity among two optical output ports of an upstream Y-splitting optical waveguide, and a light beam corresponding to a j-th bit (where j is an integer of 1 to N−1) counted from the most significant bit of the N-bit electrical digital signal is output from an optical output port with a higher output intensity among two optical output ports of a j-th Y-splitting optical waveguide counted from the most upstream Y-splitting optical waveguide and a light beam corresponding to the least significant bit is output from an optical output port with a lower output intensity among two optical output ports of a most downstream Y-splitting optical waveguide.

An exemplary configuration of the optical digital-to-analog converter of embodiments of the present invention further includes a first phase shifter configured to be adjustable such that the light beams that are combined by the combiner are made in phase.

In an exemplary configuration of the optical digital-to-analog converter of embodiments of the present invention, the combiner has a configuration in which a plurality of Y-combining optical waveguides with two inputs and one output are cascade-connected in a hierarchical manner.

An exemplary configuration of the optical digital-to-analog converter of embodiments of the present invention further includes a photodetector configured to convert the output light beam of the combiner into an electrical signal.

An exemplary configuration of the optical digital-to-analog converter of embodiments of the present invention further includes a second splitter configured to split a single light beam into two equal light beams and input a first light beam of the two output light beams to the first splitter, a Y-combining optical waveguide configured to combine the output light beam of the combiner and a second light beam of the two output light beams of the second splitter and output the combined light beam, a photodetector configured to convert the output light beam of the Y-combining optical waveguide into an electrical signal, and a second phase shifter configured to be adjustable such that the light beams that are combined by the Y-combining optical waveguide are made in phase.

An exemplary configuration of the optical digital-to-analog converter of embodiments of the present invention further includes a second splitter configured to split a single light beam into two equal light beams and input a first light beam of the two output light beams to the first splitter, a coupler configured to combine the output light beam of the combiner and a second light beam of the two output light beams of the second splitter, split the combined light beam into two equal light beams, and output the two equal light beams, a first photodetector configured to convert a first light beam of the two output light beams of the coupler into an electrical signal, a second photodetector configured to convert a second light beam of the two output light beams of the coupler into an electrical signal, a subtractor configured to obtain a difference between the two electrical signals output from the first and second photodetectors, and a second phase shifter configured to be adjustable such that a phase difference between the output light beam of the combiner and the second light beam of the two output light beams of the second splitter is made $\pi/2$.

Effects of Embodiments of the Invention

According to embodiments of the present invention, an optical digital-to-analog converter includes a first splitter, an optical intensity modulator, and a combiner, thereby achieving an optical digital-to-analog converter that can achieve both low loss and low latency and can be implemented at high speed and high density.

DETAILED DESCRIPTION OF ILLUSTRATIVE EMBODIMENTS

Figure 1:
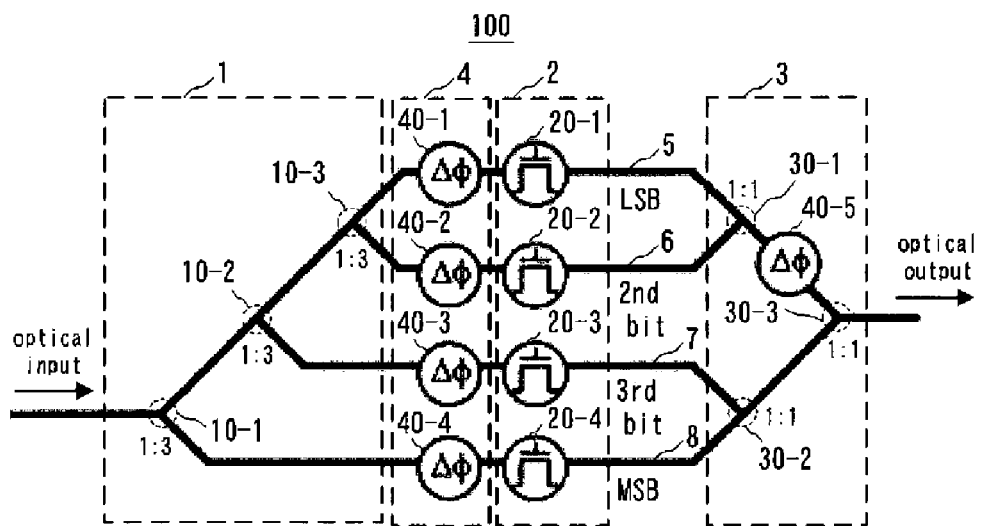
FIG. 1 is a block diagram illustrating a configuration of an optical DAC according to an embodiment of the present invention.

Hereinafter, embodiments of the present invention will be described with reference to the drawings. FIG. 1 is a block diagram illustrating a configuration of an N-bit optical DAC according to an embodiment of the present invention. The N-bit optical DAC 100 includes a 1:N splitter 1, an optical intensity modulator 2, an N:1 combiner 3, and a phase shifter 4 which will be described below. The 1:N splitter 1 splits a continuous laser light beam from a single continuous laser light source (not illustrated) into N continuous light beams corresponding to the bits of an N-bit electrical digital signal (N is an integer of 2 or more). At the same time, the 1:N splitter 1 makes the continuous light beams different in optical intensities such that (N−1) continuous light beams corresponding to bits except the least significant bit of the N-bit electrical digital signal each have an optical intensity which is a predetermined multiple (four times in the present embodiment) of that of a continuous light beam corresponding to the next less significant bit. The optical intensity modulator 2 individually intensity-modulates the N continuous light beams which are made different in optical intensities by the 1:N splitter 1 according to the corresponding bits of the N-bit electrical digital signal. The N:1 combiner 3 combines the N output light beams intensity-modulated by the optical intensity modulator 2 and outputs the combined light beam. The phase shifter 4 can be adjusted such that the light beams that are combined by the N:1 combiner 3 are made in phase. In the embodiment of FIG. 1, N=4.

The 1:N splitter 1 includes a Y-splitting optical waveguide 10-1 having a splitting ratio of 1:3, a Y-splitting optical waveguide 10-2 having a splitting ratio of 1:3, an optical input port of which is connected to an optical output port with the lower output intensity among two optical output ports of the Y-splitting optical waveguide 10-1, and a Y-splitting optical waveguide 10-3 having a splitting ratio of 1:3, an optical input port of which is connected to an optical output port with the lower output intensity among two optical output ports of the Y-splitting optical waveguide 10-2. The input-to-output transmittances T of each of the Y-splitting optical waveguides 10-1 to 10-3 for a light beam input through the optical input port thereof with respect to the two optical output ports are 0.25 and 0.75.

The 1:N splitter 1 includes (N−1) Y-splitting optical waveguides with one input and two outputs having a splitting ratio of 1:3 which are cascade-connected such that each Y-splitting optical waveguide except the most upstream Y-splitting optical waveguide receives, as an input, a light beam that is output from an optical output port with the lower output intensity among two optical output ports of an upstream Y-splitting optical waveguide as described above. This allows the continuous light beams to be made different in optical intensities such that (N−1) continuous light beams corresponding to bits except the least significant bit (LSB) of the N-bit electrical digital signal each have an optical intensity which is four times as large as that of a continuous light beam corresponding to the next less significant bit.

A light beam corresponding to a j-th bit (where j is an integer of 1 to N−1) counted from the most significant bit (MSB) of the N-bit electrical digital signal is output from an optical output port with the higher output intensity among two optical output ports of a j-th Y-splitting optical waveguide counted from the most upstream Y-splitting optical waveguide. A light beam corresponding to the LSB is output from an optical output port with the lower output intensity among two optical output ports of the most downstream Y-splitting optical waveguide.

The optical intensity modulator 2 includes N variable optical attenuators (VOAs) 20-1 to 20-4 provided corresponding to the respective bits of the N-bit electrical digital signal. Each of the variable optical attenuators 20-1 to 20-4 blocks an input light beam when a corresponding bit input of the electrical digital signal is "0" and passes an input light beam when the bit input is "1." Thus, each of the N continuous light beams is individually turned on/off according to the value of the corresponding bit of the N-bit electrical digital signal.

The variable optical attenuator 20-1 turns on/off a light beam corresponding to the LSB which will be described next according to the LSB of the 8-bit electrical digital signal. The light beam corresponding to the LSB is provided to and propagates through an optical waveguide 5 connected to the optical output port with the lower output intensity among the two optical output ports of the Y-splitting optical waveguide 10-3. The variable optical attenuator 20-2 turns on/off a light beam corresponding to the second bit from the LSB which will be described next according to the second bit of the 8-bit electrical digital signal. The light beam corresponding to the second bit from the LSB is provided to and propagates through an optical waveguide 6 connected to the optical output port with the higher output intensity among the two optical output ports of the Y-splitting optical waveguide 10-3.

The variable optical attenuator 20-3 turns on/off a light beam corresponding to the third bit from the LSB which will be described next according to the third bit of the 8-bit electrical digital signal. The light beam corresponding to the third bit from the LSB is provided to and propagates through an optical waveguide 7 connected to the optical output port with the higher output intensity among the two optical output ports of the Y-splitting optical waveguide 10-2. The variable optical attenuator 20-4 turns on/off a light beam corresponding to the MSB which will be described next according to the MSB of the 8-bit electrical digital signal. The light beam corresponding to the MSB is provided to and propagates through an optical waveguide 8 connected to the optical output port with the higher output intensity among the two optical output ports of the Y-splitting optical waveguide 10-1.

The N:1 combiner 3 has a configuration in which a plurality of Y-combining optical waveguides with two inputs and one output are cascade-connected in a hierarchical manner. Specifically, the N:1 combiner 3 includes a Y-combining optical waveguide 30-1 which combines the light beams propagating through the optical waveguides 5 and 6 at an equal ratio (a combining ratio of 1:1) and outputs the combined light beam, a Y-combining optical waveguide 30-2 which combines the light beams propagating through the optical waveguides 7 and 8 at an equal ratio and outputs the combined light beam, and a Y-combining optical waveguide 30-3 which combines the light beams output from the Y-combining optical waveguide 30-1 and 30-2 at an equal ratio and outputs the combined light beam. The input-to-output transmittances T of each of the Y-combining optical waveguides 30-1 to 30-3 for the light beams input through the two optical input ports thereof with respect to the optical output port are 0.5.

The phase shifter 4 includes a plurality of phase shifters 40-1 to 40-5. Here, the phase shifter is phase-adjusted in advance such that the optical output intensity of the N:1 combiner 3 is maximized (the light beams that are combined by each of the Y-combining optical waveguides 30-1 to 30-3 are made in phase) when the optical intensity modulator 2 (including the variable optical attenuators 20-1 to 20-4) is in the passing state. Specifically, the phase shifters 40-1 and 40-2 are phase-adjusted in advance such that the optical output intensity of the Y-combining optical waveguide 30-1 is maximized when the variable optical attenuators 20-1 and 20-2 are in the passing state. The phase shifters 40-3 and 40-4 are phase-adjusted in advance such that the optical output intensity of the Y-combining optical waveguide 30-2 is maximized when the variable optical attenuators 20-3 and 20-4 are in the passing state. The phase shifter 40-5 is phase-adjusted in advance such that the optical output intensity of the Y-combining optical waveguide 30-3 is maximized when the variable optical attenuators 20-1 to 20-4 are in the passing state.

Examples of such phase shifters 40-1 to 40-5 include, for example, a heater-type phase shifter that controls the phase of a guided light beam by changing the refractive index of an optical waveguide by the thermo-optical effect, and a phase shifter that controls the phase of a guided light beam by changing the refractive index of an optical waveguide by the electro-optical effect.

A calculation loss (Loss) in the present embodiment can be defined as in the following expression.

[Expression (1)]

$$\text{Loss} = -10\log_{10}\left(\frac{P_{out_{max}}}{P_{in}}\right) = -20\log_{10}\left(\frac{A_{out_{max}}}{P_{in}}\right) \quad (1)$$

In Expression (1), $P_{out\_max}$ is a maximum optical output intensity when inputs of the N-bit electrical digital signal are all "1," $P_{in}$ is an optical input intensity ($P_{in}$ is fixed at 1 in the present example), and $A_{out\_max}$ is an optical output amplitude which is the square root of $P_{out\_max}$.

When the intensity of an input light beam (an optical input) $P_{in}$ to the N-bit optical DAC 100 is equal to 1 as described above, the amplitude $A_{out\_max}$ of an output light beam (an optical output) from the N-bit optical DAC 100 is as follows.

[Expression (2)]

$$A_{out\_max} = \left(\sqrt{\frac{1}{N}} - \sqrt{\frac{1-T}{N}}\frac{1}{1-\sqrt{T}}\right)\cdot\sqrt{T}^{N-1} + \sqrt{\frac{1-T}{N}}\frac{1}{1-\sqrt{T}} \quad (2)$$

Figure 2:
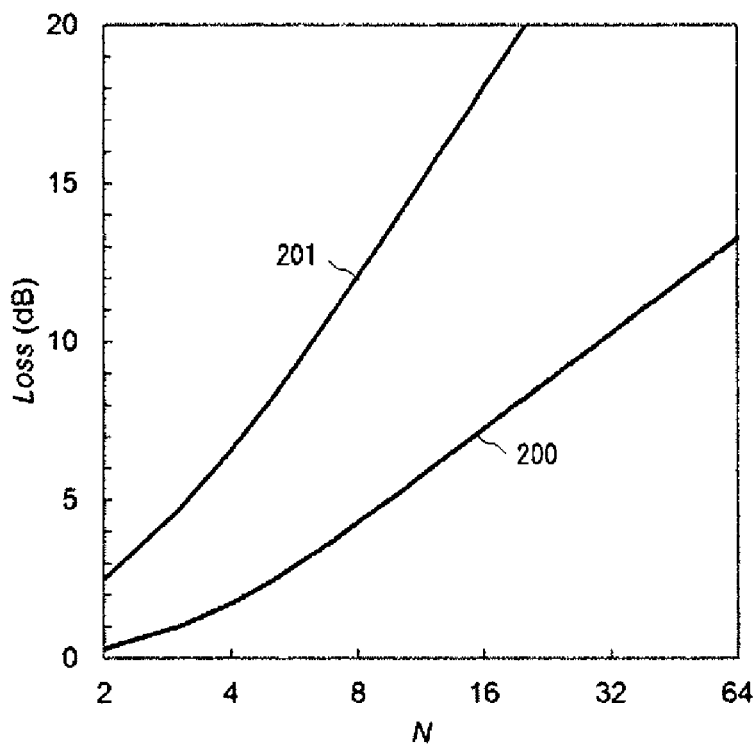
FIG. 2 is a diagram illustrating a relationship between the number of bits and calculation loss of the optical DAC.

Here, T is the optical intensity transmittance of each of the Y-combining optical waveguides 30-1 to 30-3 (ideally, 0.5). FIG. 2 illustrates the relationship between the number of bits N and the calculation loss (Loss) of the N-bit optical DAC obtained by substituting Expression (2) into Expression (1). In FIG. 2, "200" indicates the calculation loss (Loss) of the N-bit optical DAC 100 of the present example and "201" indicates the calculation loss (Loss) of an N-bit optical DAC which uses a 1:N splitter that splits an input light beam into N equal light beams, and (N−1) fixed optical attenuators instead of the 1:N splitter 1 of the present embodiment.

The (N−1) fixed optical attenuators described above add fixed amounts of losses based on bit positions to continuous light beams corresponding to the bits except the MSB of the N-bit electrical digital signal among the N equal continuous light beams resulting from the splitting by the 1:N splitter. Specifically, the (N−1) fixed optical attenuators each add a loss of 6×(i−1) dB to a continuous light beam corresponding to i-th bits (where i is an integer of 2 to N) counted from the MSB. As is clear from FIG. 2, it can be seen that the loss of the N-bit optical DAC according to the present embodiment is lower than that of the N-bit optical DAC which uses the 1:N splitter that splits an input light beam into N equal light beams and the (N−1) fixed optical attenuators, instead of the 1:N splitter 1.

As described above, the N-bit optical DAC according to the present embodiment can achieve an optical DAC that can achieve both low loss and low latency (a shortest optical path length on the combining side) and can be implemented at high speed and high density.

Figure 3:
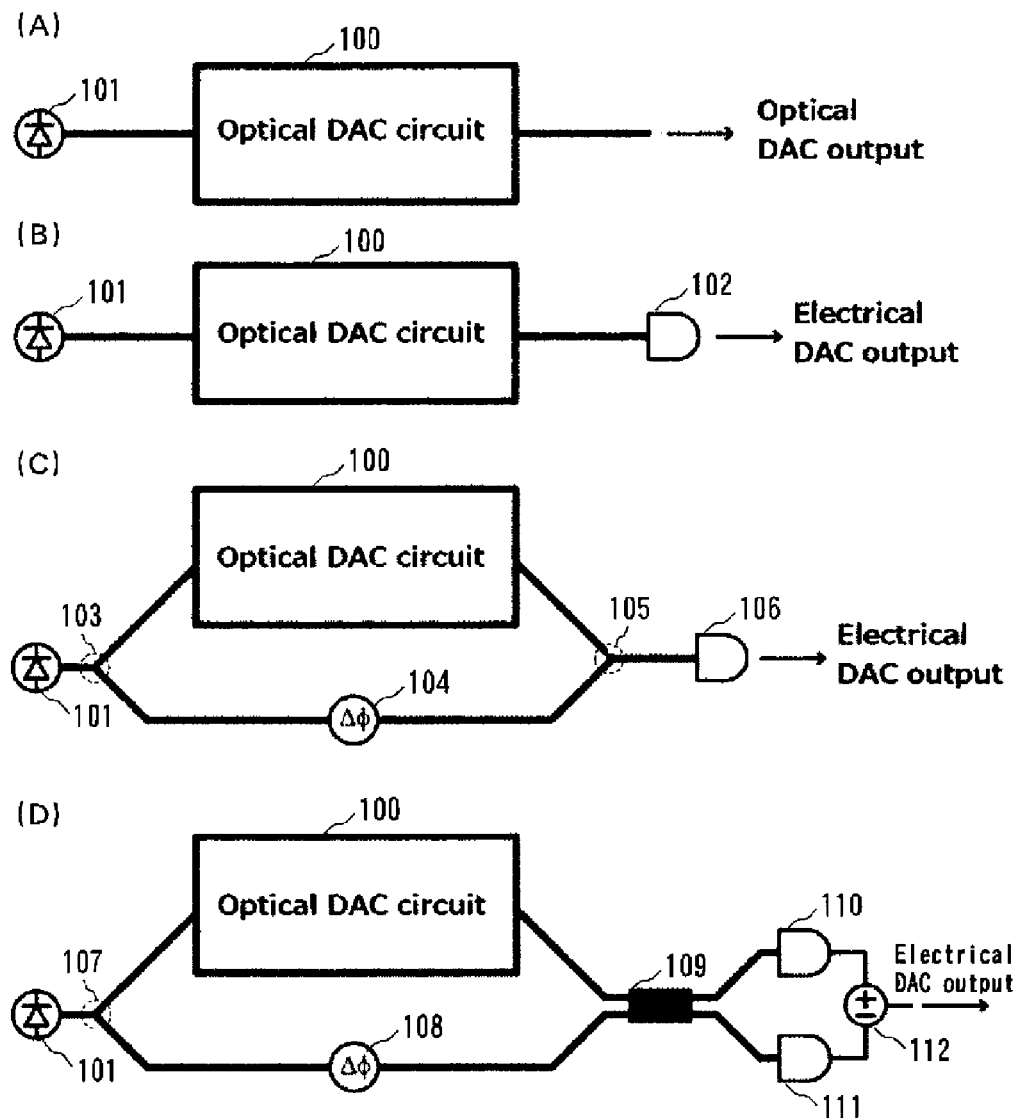
FIG. 3 is a diagram illustrating specific configuration patterns for actually operating the optical DAC of FIG. 1.

FIG. 3 illustrates specific configuration patterns for actually operating the optical DAC of FIG. 1. FIG. 3(A) illustrates a case where an optical output is provided externally as it is. In this case, a continuous laser light beam from the continuous laser light source 101 is input to the N-bit optical DAC 100.

FIG. 3(B) illustrates a case where an optical output of the N-bit optical DAC 100 is directly detected by a single photodetector 102. In this case, the photodetector 102 can obtain an electrical signal by photoelectrically converting the optical output of the N-bit optical DAC 100.

FIG. 3(C) illustrates a case where continuous light beams with specific amplitudes and phases are added together by a Y-combining optical waveguide 105 and then directly detected by a single photodetector 106. In the example of FIG. 3(C), a continuous laser light beam from a continuous laser light source 101 is split into two equal light beams by a 1:2 splitter 103, one of the two continuous light beams is input to the N-bit optical DAC 100, and the other continuous light beam is combined with a light beam output from the N-bit optical DAC 100 by the Y-combining optical waveguide 105. Here, a phase shifter 104 is phase-adjusted in advance such that the optical output intensity of the Y-combining optical waveguide 105 is maximized.

FIG. 3(D) illustrates a case of so-called coherent detection. In the example of FIG. 3(D), a continuous laser light beam from the continuous laser light source 101 is split into two equal light beams by a 1:2 splitter 107, one of the two continuous light beams is input to the N-bit optical DAC 100, and the other continuous light beam is combined with a light beam output from the N-bit optical DAC 100 by a 3 dB coupler (MMI coupler) 109. A phase shifter 108 may be phase-adjusted in advance such that the phase difference between the light beam output from the N-bit optical DAC 100 and input to the 3 dB coupler 109 and the other continuous light beam (reference light beam) obtained through the splitting of the 1:2 splitter 107 is made $\pi/2$.

The 3 dB coupler 109 combines the light beam output from the N-bit optical DAC 100 and the reference light beam a phase of which has been adjusted by the phase shifter 108 at an equal ratio, splits the combined light beam into two equal light beams, and outputs the two light beams. Photodetectors no and in convert the two output light beams from the 3 dB coupler 109 into electrical signals. A subtractor 112 obtains the difference between the two electrical signals output from the photodetectors no and in.

A non-linear output in the form of a quadratic function is obtained in the cases of direct detection in FIGS. 3(B) and 3(C), while a linear output is obtained in the case of coherent detection in FIG. 3(D).

The results of simulations of the configuration of the present embodiment using Optiwave's OptiSystem will be described below. The results of simulations described below are those for the configuration of FIG. 4, that is, a combination of the configurations of FIGS. 1 and 3(B). The following are common conditions for the simulations.

(I) Regarding the laser light source 101, it is assumed that a wavelength is 1550 nm, that an optical intensity is 1 mW, that a line width is 10 MHz, and that an initial phase is −90°.

(II) Regarding the variable optical attenuators 20-1 to 20-4, it is assumed that no loss occurs, that an LSB bit rate is 10 Gbps, that an extinction ratio is infinite, and that rise and fall times are 0.05 bits (8 ps). Electrical digital signals "0000" to "1111" are sequentially input to the respective variable optical attenuators 20-1 to 20-4 of the bits.

Figure 4:
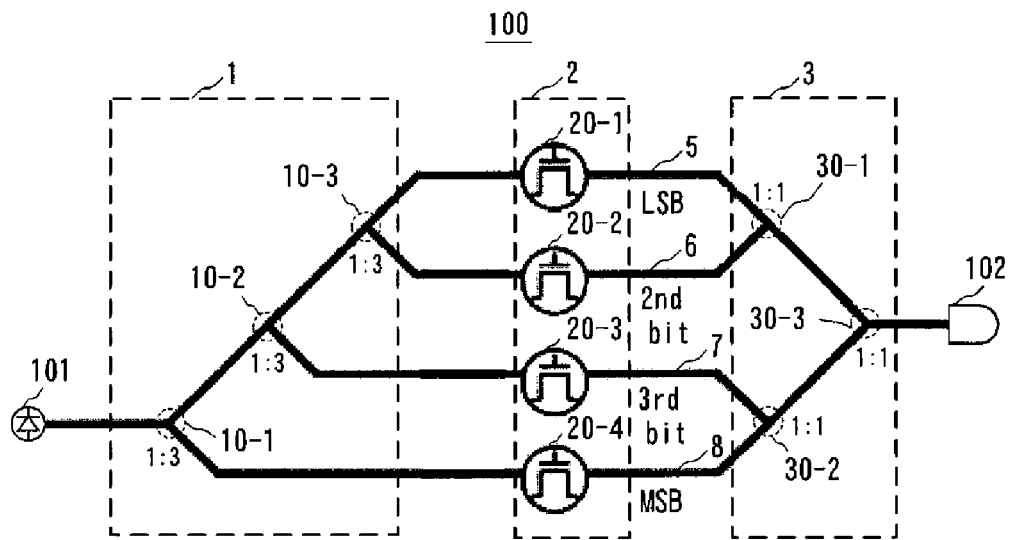
FIG. 4 is a block diagram illustrating a configuration of an optical DAC to be simulated.

(III) Regarding the optical waveguides and the coupler used in the configuration of FIG. 4, it is assumed that no loss occurs and that optical signals of the bits have no propagation delay differences and phase shifts due to length differences of optical paths. Thus, light beams are always combined in phase and therefore the phase shifters 40-1 to 40-5 for adjustment are omitted in the configuration of FIG. 4.

(IV) Regarding the photodetector 102, it is assumed that a conversion efficiency is 1 A/W, that no noise is made, and that a bandwidth is unlimited.

Figure 5:
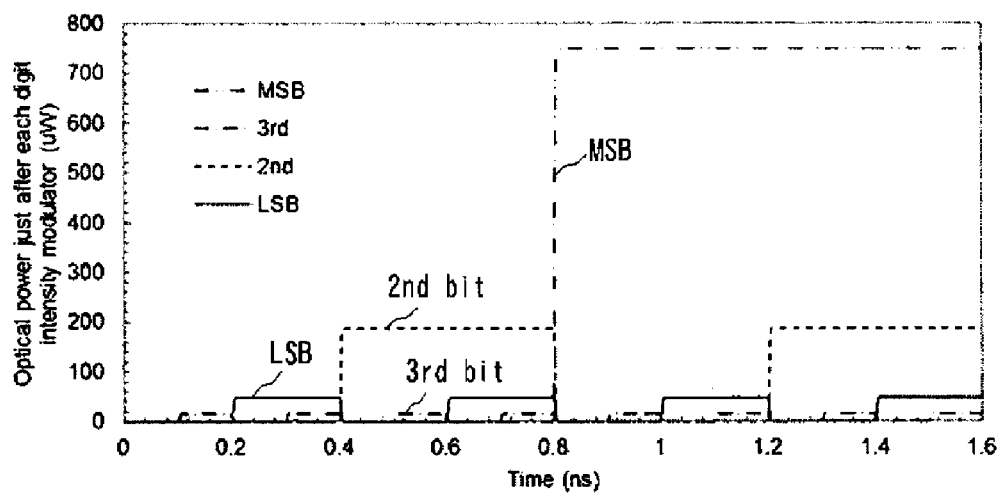
FIG. 5 illustrates a simulation result of temporal changes in optical signal intensities of bits in the configuration of FIG. 4.

FIG. 5 illustrates a simulation result of temporal changes in the optical signal intensities of bits in the configuration of FIG. 4. In FIG. 5, the vertical axis represents the optical signal intensity of each bit and the horizontal axis represents a time. It can be seen from FIG. 5 that there are already intensity differences of 4 times (6 dB) between the bits before the N:1 combiner 3 combines light beams.

Figure 6:
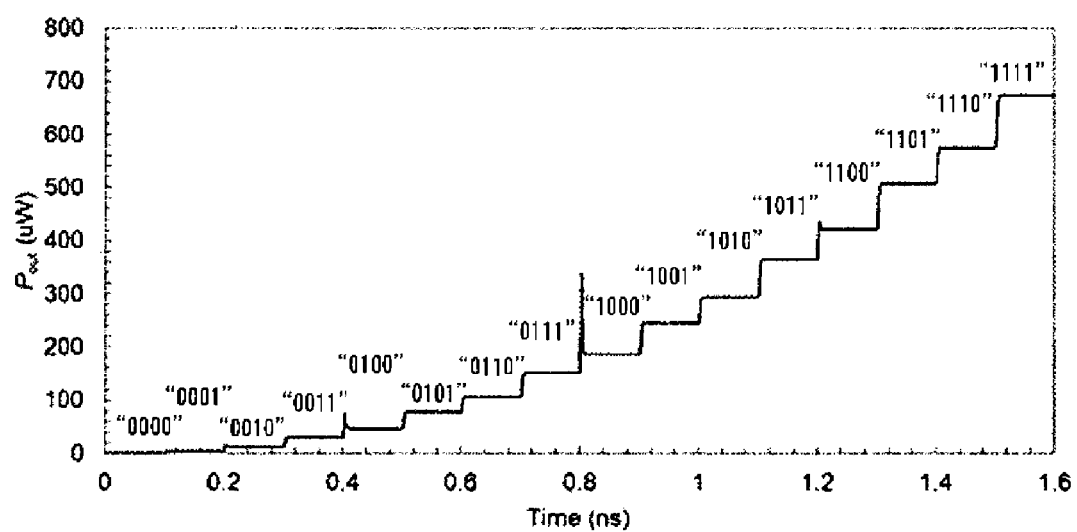
FIG. 6 illustrates a simulation result of a temporal change in an electrical signal intensity detected by a photodetector in the configuration of FIG. 4.

FIG. 6 illustrates a simulation result of a temporal change in the electrical signal intensity $P_{out}$ detected by the photodetector 102. It can be seen from FIG. 6 that $P_{out}$ is gradually increased by sequentially inputting electrical digital signals "0000" to "1111" to the variable optical attenuators 20-1 to 20-4. However, the output is in the form of a quadratic function due to direct detection as described above, and when the electrical digital signal is "1111," $P_{out}$ is about 673 μW and thus the calculation loss (Loss) is about 1.72 dB. The value of this electrical signal intensity $P_{out}$ matches the value obtained by Expression (2).

INDUSTRIAL AVAILABILITY

Embodiments of the present invention can be applied to a technology of converting an electrical digital signal into an analog signal using an optical circuit.

REFERENCE SIGNS LIST 1 1:N splitter
2 Optical intensity modulator
3 N:1 combiner
4, 40-1 to 40-5 Phase shifter
5 to 8 Optical waveguide
10-1 to 10-3 Y-splitting optical waveguide
20-1 to 20-4 Variable optical attenuator
30-1 to 30-3 Y-combining optical waveguide
100 N-bit optical DAC
101 Continuous laser light source
102, 106, 110, 111 Photodetector
103, 107 1:2 splitter
104, 108 Phase shifter
105 Y-combining optical waveguide
112 Subtractor

The invention claimed is:

1. An optical digital-to-analog converter comprising:
a first splitter configured to split a single light beam into N light beams corresponding to bits of an N-bit electrical digital signal and make the N light beams different in optical intensities such that (N−1) light beams corresponding to the bits except a least significant bit of the N-bit electrical digital signal each have an optical intensity which is a predetermined multiple of an optical intensity of a light beam of the N light beams corresponding to a next less significant bit of the N-bit electrical digital signal, wherein N is an integer of 2 or more;
an optical intensity modulator configured to individually intensity-modulate the N light beams according to corresponding bits of the N-bit electrical digital signal; and
a combiner configured to combine the N light beams into a combined light beam and output the combined light beam, wherein the combiner has a configuration in which a plurality of Y-combining optical waveguides with two inputs and one output are cascade-connected in a hierarchical manner.

2. The optical digital-to-analog converter according to claim 1, wherein the predetermined multiple is four.

3. The optical digital-to-analog converter according to claim 2, wherein:
the first splitter includes (N−1) Y-splitting optical waveguides having a splitting ratio of 1:3;

the (N−1) Y-splitting optical waveguides are cascade-connected such that each Y-splitting optical waveguide except a most upstream Y-splitting optical waveguide of the (N−1) Y-splitting optical waveguides is configured to receive, as an input, a light beam that is output from an optical output port with a lower output intensity among two optical output ports of an upstream Y-splitting optical waveguide; and a light beam corresponding to a j-th bit (counted from the most significant bit of the N-bit electrical digital signal is output from an optical output port with a higher output intensity among two optical output ports of a j-th Y-splitting optical waveguide counted from the most upstream Y-splitting optical waveguide and a light beam corresponding to the least significant bit is output from an optical output port with a lower output intensity among two optical output ports of a most downstream Y-splitting optical waveguide, wherein j is an integer of 1 to N−1.

4. The optical digital-to-analog converter according to claim 3, further comprising a first phase shifter configured to be adjustable such that the N light beams that are combined by the combiner are made in phase.

5. The optical digital-to-analog converter according to claim 1, further comprising a photodetector configured to convert the combined light beam output from the combiner into an electrical signal.

6. The optical digital-to-analog converter according to claim 1, further comprising:
a second splitter configured to split a single light beam into two equal light beams and input a first light beam of the two equal light beams to the first splitter;
a Y-combining optical waveguide configured to combine the combined light beam output from the combiner and a second light beam of the two equal light beams output from the second splitter into a second combined light beam and output the second combined light beam;
a photodetector configured to convert the second combined light beam output from the Y-combining optical waveguide into an electrical signal; and
a second phase shifter configured to be adjustable such that the light beams that are combined by the Y-combining optical waveguide are made in phase.

7. The optical digital-to-analog converter according to claim 1, further comprising:
a second splitter configured to split a single light beam into two equal light beams and input a first light beam of the two equal light beams to the first splitter;
a coupler configured to combine the combined light beam output from the combiner and a second light beam of the two equal light beams output from the second splitter into a second combined light beam, split the second combined light beam into two equal light beams of the coupler, and output the two equal light beams of the coupler;
a first photodetector configured to convert a first light beam of the two equal light beams output by the coupler into a first electrical signal;
a second photodetector configured to convert a second light beam of the two equal light beams output by the coupler into a second electrical signal;
a subtractor configured to obtain a difference between the first and the second electrical signals output from the first and the second photodetectors; and
a second phase shifter configured to be adjustable such that a phase difference between the combined light beam output from the combiner and the second light beam of the two equal light beams output from the second splitter is $\pi/2$.

8. A method of operating an optical digital-to-analog converter, the method comprising:
splitting, by a first splitter, a single light beam into N light beams corresponding to bits of an N-bit electrical digital signal and making the N light beams different in optical intensities such that (N−1) light beams corresponding to the bits except a least significant bit of the N-bit electrical digital signal each have an optical intensity which is a predetermined multiple of an optical intensity of a light beam of the N light beams corresponding to a next less significant bit of the N-bit electrical digital signal, wherein N is an integer of 2 or more;
individually intensity-modulating the N light beams according to corresponding bits of the N-bit electrical digital signal by an optical intensity modulator; and
combining, by a combiner, the N light beams into a combined light beam and outputting the combined light beam, wherein the combiner has a configuration in which a plurality of Y-combining optical waveguides with two inputs and one output are cascade-connected in a hierarchical manner.

9. The method according to claim 8, wherein the predetermined multiple is four.

10. The method according to claim 9, wherein:
the first splitter includes (N−1) Y-splitting optical waveguides having a splitting ratio of 1:3;
the Y-splitting optical waveguides are cascade-connected such that each Y-splitting optical waveguide except a most upstream Y-splitting optical waveguide of the (N−1) Y-splitting optical waveguides receives, as an input, a light beam that is output from an optical output port with a lower output intensity among two optical output ports of an upstream Y-splitting optical waveguide; and
a light beam corresponding to a j-th bit counted from the most significant bit of the N-bit electrical digital signal is output from an optical output port with a higher output intensity among two optical output ports of a j-th Y-splitting optical waveguide counted from the most upstream Y-splitting optical waveguide and a light beam corresponding to the least significant bit is output from an optical output port with a lower output intensity among two optical output ports of a most downstream Y-splitting optical waveguide, wherein j is an integer of 1 to N−1.

11. The method according to claim 10, further comprising a first phase shifter that is adjustable such that the N light beams that are combined by the combiner are made in phase.

12. The method according to claim 8, further comprising converting, by a photodetector, the combined light beam output from the combiner into an electrical signal.

13. The method according to claim 8, further comprising:
splitting, by a second splitter, a single light beam into two equal light beams and inputting a first light beam of the two equal light beams to the first splitter;
combining, by a Y-combining optical waveguide, the combined light beam output from the combiner and a second light beam of the two equal light beams output from the second splitter into a second combined light beam and outputting the second combined light beam;
converting, by a photodetector, the second combined light beam output from the Y-combining optical waveguide into an electrical signal; and adjusting a second phase shifter such that the light beams that are combined by the Y-combining optical waveguide are made in phase.

14. The method according to claim 8, further comprising:
splitting, by a second splitter, a single light beam into two equal light beams and inputting a first light beam of the two equal light beams to the first splitter;
combining, by a coupler, the combined light beam output from the combiner and a second light beam of the two equal light beams output from the second splitter into a second combined light beam, splitting the second combined light beam into two equal light beams of the coupler, and outputting the two equal light beams of the coupler;
converting, by a first photodetector, a first light beam of the two equal light beams output by the coupler into a first electrical signal;
converting, by a second photodetector, a second light beam of the two equal light beams output by the coupler into a second electrical signal;
obtaining, by a subtractor, a difference between the first and the second electrical signals output from the first and the second photodetectors; and
adjusting a second phase shifter such that a phase difference between the combined light beam output from the combiner and the second light beam of the two equal light beams output from the second splitter is $\pi/2$.

15. An optical digital-to-analog converter comprising:
a first splitter configured to split a single light beam into N light beams corresponding to bits of an N-bit electrical digital signal and make the N light beams different in optical intensities such that (N−1) light beams corresponding to the bits except a least significant bit of the N-bit electrical digital signal each have an optical intensity which is a predetermined multiple of an optical intensity of a light beam of the N light beams corresponding to a next less significant bit of the N-bit electrical digital signal, wherein N is an integer of 2 or more, and wherein the predetermined multiple is four;
an optical intensity modulator configured to individually intensity-modulate the N light beams according to corresponding bits of the N-bit electrical digital signal; and
a combiner configured to combine the N light beams into a combined light beam and output the combined light beam.

16. The optical digital-to-analog converter according to claim 15, wherein:
the first splitter includes (N−1) Y-splitting optical waveguides having a splitting ratio of 1:3;
the (N−1) Y-splitting optical waveguides are cascade-connected such that each Y-splitting optical waveguide except a most upstream Y-splitting optical waveguide of the (N−1) Y-splitting optical waveguides is configured to receive, as an input, a light beam that is output from an optical output port with a lower output intensity among two optical output ports of an upstream Y-splitting optical waveguide; and
a light beam corresponding to a j-th bit (counted from the most significant bit of the N-bit electrical digital signal is output from an optical output port with a higher output intensity among two optical output ports of a j-th Y-splitting optical waveguide counted from the most upstream Y-splitting optical waveguide and a light beam corresponding to the least significant bit is output from an optical output port with a lower output intensity among two optical output ports of a most downstream Y-splitting optical waveguide, wherein j is an integer of 1 to N−1.

17. The optical digital-to-analog converter according to claim 16, further comprising a first phase shifter configured to be adjustable such that the N light beams that are combined by the combiner are made in phase.

18. The optical digital-to-analog converter according to claim 15, further comprising a photodetector configured to convert the combined light beam output from the combiner into an electrical signal.

\* \* \* \* \*